(12) United States Patent
Hedley et al.

(10) Patent No.: US 9,313,764 B2
(45) Date of Patent: Apr. 12, 2016

(54) WIRELESS LOCALISATION SYSTEM

(75) Inventors: Mark Hedley, St. Leonards (AU);
Yingjie Jay Guo, Beecroft (AU);
Xiaojing Huang, North Ryde (AU)

(73) Assignee: Commonwealth Scientific and Industrial Research Organisation, Campbell Australian Capital Territory (AU)

( * ) Notice: Subject to any disclaimer, the term of this patent is extended or adjusted under 35 U.S.C. 154(b) by 0 days.

(21) Appl. No.: 14/233,997

(22) PCT Filed: Jul. 20, 2011

(86) PCT No.: PCT/AU2011/000920
§ 371 (c)(1),
(2), (4) Date: Feb. 28, 2014

(87) PCT Pub. No.: WO2013/010204
PCT Pub. Date: Jan. 24, 2013

(65) Prior Publication Data
US 2014/0194142 A1    Jul. 10, 2014

(51) Int. Cl.
*H04W 24/00* (2009.01)
*H04W 64/00* (2009.01)
*G01S 5/14* (2006.01)
*G01S 13/87* (2006.01)
*G01S 13/76* (2006.01)

(52) U.S. Cl.
CPC ............. *H04W 64/00* (2013.01); *G01S 5/14* (2013.01); *G01S 13/878* (2013.01); *G01S 13/76* (2013.01)

(58) Field of Classification Search
CPC ......... G01S 5/14; G01S 13/878; G01S 13/76; G01S 1/02; G01S 1/00; G01S 3/14; G01S 3/02; G01S 5/12; G01S 3/48; H04W 64/00; H04B 15/00; H01Q 1/24; H03W 64/00
USPC ............................................ 342/378; 370/342
See application file for complete search history.

(56) References Cited

U.S. PATENT DOCUMENTS

| | | | |
|---|---|---|---|
| 4,728,959 A * | 3/1988 | Maloney et al. ............... | 342/457 |
| 6,347,229 B1 | 2/2002 | Zelmanovich | |
| 6,489,923 B1 * | 12/2002 | Bevan et al. .................. | 342/378 |
| 6,812,824 B1 * | 11/2004 | Goldinger .............. | G06K 17/00 340/10.1 |

(Continued)

OTHER PUBLICATIONS

Chi-Square Minimization John W. Fowler Mar. 12, 2008.*

(Continued)

*Primary Examiner* — Mahendra Patel
(74) *Attorney, Agent, or Firm* — Fitch, Even, Tabin & Flannery, LLP

(57) ABSTRACT

Disclosed is an apparatus for estimating the location of a remote node. The apparatus comprises an antenna array comprising a plurality of elements in a fixed spatial arrangement, at least one element being a transmitting element configured to transmit a first wireless signal to the remote node, and at least two elements being receiving elements configured to receive a second wireless signal transmitted by the remote node in response to the first wireless signal. The apparatus further comprises a signal processing unit connected to the antenna array, the signal processing unit being configured to: estimate a plurality of round trip distances using the wireless signals, each round trip distance being from a transmitting element to the remote node and back to a receiving element; and estimate the location of the remote node using the round trip distance estimates.

14 Claims, 7 Drawing Sheets

(56) References Cited

U.S. PATENT DOCUMENTS

| | | | |
|---|---|---|---|
| 7,170,441 | B2 | 1/2007 | Perl et al. |
| 7,466,262 | B2 | 12/2008 | Stephens |
| 9,014,162 | B2 * | 4/2015 | Brundage et al. ............. 370/338 |
| 2002/0155845 | A1 * | 10/2002 | Martorana ............. G01S 1/022 455/456.1 |
| 2004/0117149 | A1 * | 6/2004 | Engbrecht ..................... 702/182 |
| 2008/0143482 | A1 | 6/2008 | Shoarinejad et al. |
| 2010/0135178 | A1 | 6/2010 | Aggarwal et al. |
| 2010/0273504 | A1 * | 10/2010 | Bull et al. ................... 455/456.1 |
| 2011/0111751 | A1 * | 5/2011 | Markhovsky ............. G01S 3/74 455/423 |
| 2011/0286505 | A1 * | 11/2011 | Hedley .................. G01S 5/0205 375/224 |
| 2012/0033761 | A1 * | 2/2012 | Guo ........................ G01S 3/023 375/316 |
| 2012/0165012 | A1 * | 6/2012 | Fischer et al. ............. 455/435.1 |

OTHER PUBLICATIONS

International Search Report for International Application No. PCT/AU2011/000920 dated Jul. 20, 2011.

A. Bensky, Wireless Positioning Technologies and Applications, Artech House Inc., 2008.

Y. Fu and Z. Tian, "Cramer-Rao bounds for hybrid TOA/DOA-based location estimation in sensor networks," IEEE Signal Processing Letters, vol. 16, No. 8, pp. 655-658, Aug. 2009.

M. Feder and E. Weinstein, "Parameter estimation of superimposed signals using the EM algorithm," IEEE Trans. on Acous., Speech, and Sig. Proc., vol. 36, No. 4, pp. 477-489, 1988.

J. Fessler and A. Hero, "Space-alternating generalized expectation maximization algorithm," IEEE Trans. on Sig. Proc., vol. 42, No. 10, pp. 2664-2677, 1994.

B. Fleury, M. Tschudin, R. Heddergott, D. Dahlhaus, and K. Pedersen,"Channel parameter estimation in mobile radio environments using the SAGE algorithm," IEEE J. on Selected Areas in Comm., vol. 17, No. 3, pp. 434-450, 1999.

M. Vanderveen, A. Vanderveen, and A. Paulraj, "Estimation of multipath parameters in wireless communications," IEEE Trans. on Sig. Proc.,vol. 46, No. 3, pp. 682-690, 1998.

M. Zoltowski, M. Haardt, and C. Mathews, "Closed-form 2-D angle estimation with rectangular arrays in element space or beamspace via unitary ESPRIT," IEEE Trans. on Sig. Proc., vol. 44, No. 2, pp. 316-328,1996.

J. C. Lagarias, J. A. Reeds, M. H. Wright, and P. E. Wright, "Convergence properties of the Nelder-Mead simplex method in low dimensions," SIAM Journal of Optimization, vol. 9, No. 1, pp. 112-147, 1998.

Wei Li et al "Comparative study of joint TOA/DOA estimation techniques for mobile positioning applications", 2009.

Lagunai et al "UWB joint TOA and DOA estimation", Sep. 11, 2009.

Extended European Search Report for European Application No. 11 86 9738 dated Mar. 10, 2015.

* cited by examiner

WIRELESS LOCALISATION SYSTEM

TECHNICAL FIELD

The present invention relates generally to localisation systems and, in particular, to methods and systems for localisation of mobile nodes using wireless communication.

BACKGROUND

Localisation, or positioning, is the estimation of the location of one or more mobile targets, either in absolute terms or relative to a fixed position. Wireless positioning systems in which the target is equipped with a wireless transmitter and/or receiver are widely used in location based services such as surveillance and monitoring, person and asset tracking, public safety, and emergency rescue. Known techniques for wireless positioning include those based on time-of-arrival (ToA) measurements and/or direction-of-arrival (DoA) measurements. ToA-based wireless positioning systems normally require the setting up of multiple fixed anchor or referencing nodes. The range from a target to each anchor/referencing node can be estimated from the ToA measurement. With the knowledge of the spatial location of the fixed anchor/referencing nodes, multilateration may be performed to estimate the location of the target. DoA-based systems also require multiple fixed anchor/referencing nodes. However, instead of measuring the range from the target, each anchor/referencing node estimates the incident angle of a signal transmitted from the target, for example using an antenna array. The location of the target can be estimated using the measured DoAs, using triangulation from the known locations of the anchor/referencing nodes. The DoA is usually determined using the phase of the signal from a plurality of elements in an antenna array. However, the spacing between the array elements is limited by the need to avoid phase ambiguity, which results in multiple solutions for the DoA of the received signal. This puts either an upper limit on the aperture width of the array, and hence the resolution of the DoA estimate, or a lower limit on the number of elements, which increases the computational complexity.

For many applications, it is desirable to have a positioning system in which a single nomadic "master node" can communicate with all the targets so the locations of the latter can be estimated by the former. In one example scenario, a large number of workers, each equipped with a radio frequency "tag", are scattered around a worksite. For safety reasons, a manager at the master node, which is also mobile, needs to know the location of each worker at all times. Conventional triangulation-based positioning systems using ToA or DoA alone cannot be used because there is only a single anchor node, namely the master node. Joint ToA/DoA-based positioning, involving both ToA and DoA measurements, may be used to estimate the tag locations. However, joint ToA/DoA location estimation is typically a computationally intensive problem. The optimal maximum-likelihood (ML) estimation involves a two-dimensional (2D) search over the range and bearing to maximize the probability density function of the received signals at all antenna elements at the master node, conditioned on the signal ToAs and DoAs.

To reduce the complexity, several efficient algorithms based on the ML principle have been developed, such as the expectation maximization (EM) and the space-alternating generalized expectation maximization (SAGE). Another category of joint ToA/DoA estimation algorithms is based on the subspace principle. These algorithms include the joint angle and delay estimation (JADE), and the multi-dimensional estimation of signal parameters via rotational invariance technique (MD-ESPRIT). However, such techniques are still too computationally intensive to be implemented in a practical wireless positioning system for the above-mentioned scenario.

SUMMARY

It is an object of the present invention to substantially overcome, or at least ameliorate, one or more disadvantages of existing arrangements.

Disclosed herein are wireless positioning systems and methods employing a single master node that provide greater accuracy at less computational cost than conventional wireless positioning systems. The disclosed systems comprise one nomadic master node equipped with an array of antenna elements, and one or more mobile nodes whose locations relative to the master node are to be estimated. Each mobile node comprises a transceiver configured to receive and transmit wireless signals from and to the master node. In one implementation, the antenna array in the master node has multiple receive-only elements and one transmit-only element, and round trip distances are measured from the transmit-only element to the mobile node and back to each receive-only antenna element either in a synchronised or an un-synchronised manner. The master node is configured to estimate the location of the mobile node with respect to the master node using the round trip distances and optionally measurements of phase of the received signal. In another implementation, each antenna element at the master node is configured to both transmit to and receive from the mobile node. Round trip distances are measured between each element and the mobile node. The master node is configured to use the round trip distances, and also optionally measurements of phase of the received signal, to estimate the location of the mobile node. In both implementations, the location estimate is the solution of a set of linear equations using a least squares method, which reduces the computational burden compared to conventional localisation systems. Methods are also disclosed to resolve the ambiguity of phase measurements resulting when the antenna element spacing within the array is greater than half a wavelength of the wireless signals.

According to a first aspect of the present disclosure, there is provided an apparatus for estimating the location of a remote node, the apparatus comprising: an antenna array comprising a plurality of elements in a fixed spatial arrangement, at least one element being a transmitting element configured to transmit a first wireless signal to the remote node, and at least two elements being receiving elements configured to receive a second wireless signal transmitted by the remote node in response to the first wireless signal; and a signal processing unit connected to the antenna array, the signal processing unit being configured to: estimate a plurality of round trip distances using the wireless signals, each round trip distance being from a transmitting element to the remote node and back to a receiving element; and estimate the location of the remote node using the round trip distance estimates.

According to a second aspect of the present disclosure, there is provided a method of estimating a location of a remote node, the method comprising: estimating a plurality of round trip distances, each round trip distance being from a transmitting element to the remote node and back to one of a plurality of receiving elements based on a first wireless signal transmitted by the transmitting element to the mobile node and a second wireless signal transmitted by the mobile node to the receiving element; and estimating the location of the remote node using the round trip distance estimates.

DESCRIPTION OF THE DRAWINGS

At least one embodiment of the present invention will now be described with reference to the drawings, in which.

DETAILED DESCRIPTION

Figure 1:
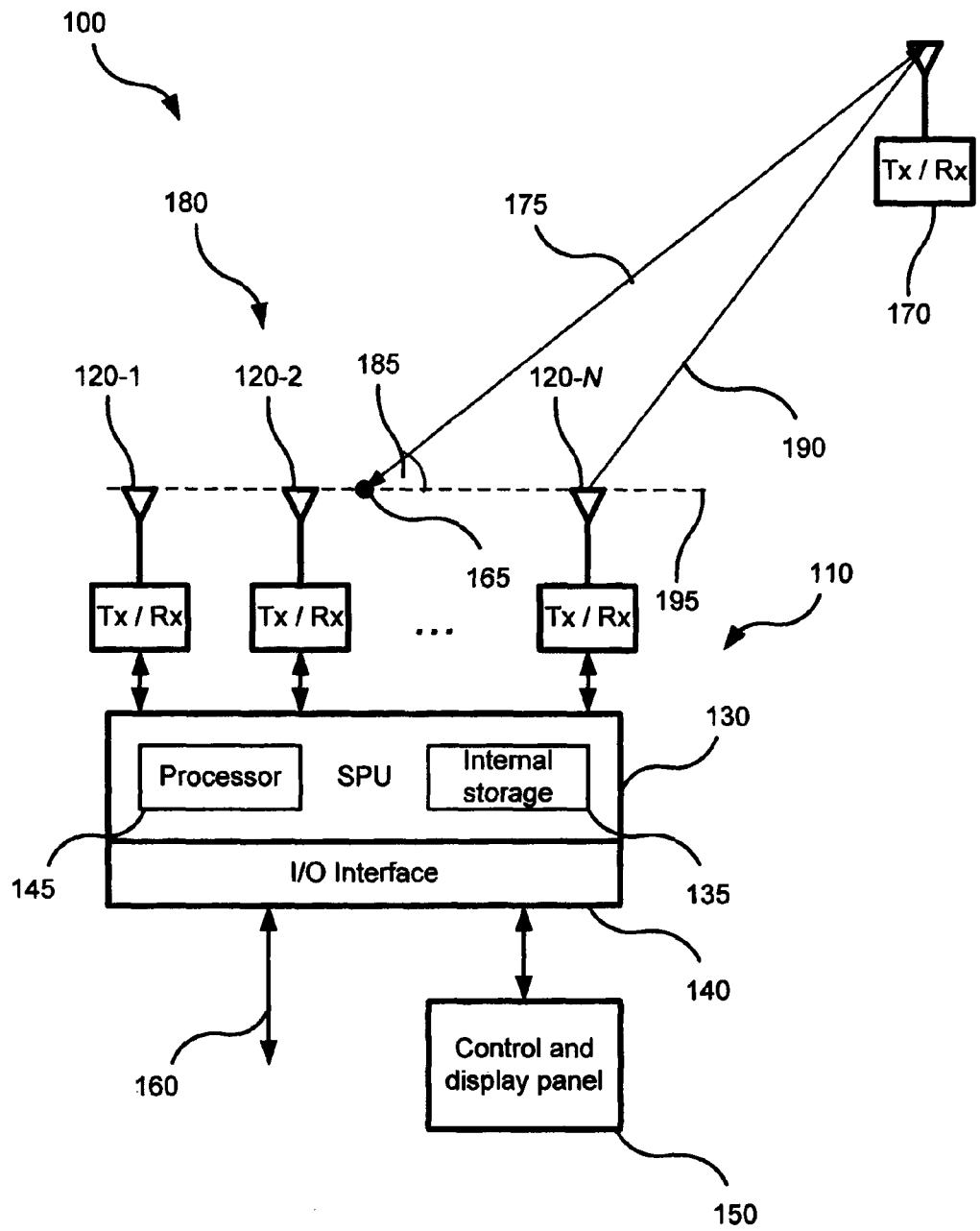
FIG. 1 is a block diagram of a wireless positioning system within which the embodiments of the invention may be implemented.

Where reference is made in any one or more of the accompanying drawings to steps and/or features, which have the same reference numerals, those steps and/or features have for the purposes of this description the same function(s) or operation(s), unless the contrary intention appears.

FIG. 1 is a block diagram of a wireless positioning system 100 within which the embodiments of the invention may be implemented. The system 100 comprises an apparatus 110 referred to herein as the "master node", and at least one remote or mobile node 170. In principle there is no limit to the number of mobile nodes that may be localised, as the mobile node 170 is localised independently of any others in the system 100. When multiple mobile nodes 170 are to be localised, the following techniques are suitable to avoid interference between the independent location estimates:

Assign different timeslots for different mobile nodes 170;
Assign different spreading sequences (codes) for different mobile nodes 170;
Assign different frequencies for different mobile nodes 170;
Any carrier sense multiple access strategies.

The master node 110 can be situated at a fixed location or carried by a vehicle. The master node 110 has an antenna array 180 comprising N elements 120-1, 120-2, . . . , 120-N in a fixed spatial arrangement. In different implementations, the elements 120-$n$ ($n=1, \ldots, N$) of the antenna array 180 are arranged in a plane (i.e., a 2D or planar array) or several planes (i.e., a 3D array). A 2D array implementation is sufficient for 2D positioning of the mobile node 170, while a 3D array implementation is particularly suited for 3D positioning of the mobile node 170. In the present disclosure the term "positioning" and "localisation" are intended to cover two dimensional location estimation; however the disclosed system can be readily extended to three dimensional positioning, for example measuring azimuth and elevation to the mobile node.

Each element 120-$n$ comprises a module, labelled as Tx/Rx in FIG. 1, that is configured to transmit (transmitting elements), receive (receiving elements), or both transmit and receive (transceiver elements) wireless signals via an antenna. In the present disclosure the term "wireless" is intended to cover radio frequency electromagnetic signals; however the disclosed system can be readily modified to use any propagating wave, such as acoustic signals.

The mobile node 170 comprises a single transceiver connected to an antenna. In one implementation, the mobile node 170 is a radio frequency tag that is carried by a person or any other moving object that is to be localised by the system 100.

The antenna array 180 is connected to a signal processing unit (SPU) 130 which has an input/output (I/O) interface 140. The SPU 130 is configured to control the transmit and/or receive operation of each element 120-$n$ and to estimate the location of the mobile node 170 relative to a reference point, e.g. the point 165, in the antenna array 180. In the 2D implementation, location of the mobile node 170 (or any other point) is defined in two-dimensional polar coordinates, as a range 175 and a bearing 185. For the mobile node 170, bearing is defined as the angle 185 between the line connecting the reference point 165 and the mobile node 170 and a reference line 195 through the reference point 165.

The I/O interface 140 connects the SPU 130 to a control and display panel 150. The control and display panel 150 is configured to input commands from a user of the positioning system 100 for operational control of the system 100, and to display the estimated location information about the mobile node 170. The I/O interface 140 may also be connected to an external device or network (not shown) via a connection 160, which may be for example a USB port or an Ethernet port, for exchange of information with that device or network.

In one implementation, the master node 110 is configured to relate its local coordinates to global coordinates so that the system 100 can relate the estimated location of the mobile node 170 to maps and information in geospatial databases defined in the global coordinates. This requires knowledge of the location and orientation of the master node 110 in the global coordinates. Location can be determined using the global positioning system (GPS) in the conventional manner. Orientation can be measured using GPS if the master node 110 is moving; this measurement may augmented using a gyroscope or a magnetometer.

The SPU 130 can be implemented as a field programmable gate array (FPGA) and/or a digital signal processor (DSP). In one implementation, the SPU 130 comprises both an FPGA for low-level processing and a DSP for high-level processing, to which the control and display panel 150 and the external connection 160 are connected. The use of a common FPGA for all low-level processing ensures time-synchronisation between all the elements 120-$n$ in the array 180. Low-level processing includes such tasks as automatic gain control of the Tx/Rx modules, detection of packets, symbol timing recovery, and symbol decoding.

According to a first embodiment, the mobile node 170 is configured to measure the ToA of a signal received from a single transmitting element 120-$i$ in the antenna array 180. Each of multiple receiving elements 120-$j$ in the antenna array 180 is configured to measure the ToA of a signal transmitted by the mobile node 170 in response to the signal received from the single transmitting element 120-$i$. (In general, the transmitting element 120-$i$ is not the same as any receiving element 120-$j$). The ToA is measured at each receiving element 120-$j$ relative to a common master clock at the master node 110, which requires all the receiving elements 120-$j$ to be time-synchronised. The ToA measurements from a receiving element 120-$j$ and the mobile node 170 are used by the SPU 130 to estimate the "round trip distance" of a signal from the transmitting element 120-$i$ to the mobile node 170 and back to that receiving element 120-$j$. The round trip distance is estimated by multiplying the round trip time of flight by the speed of signal propagation (the speed of light for radio frequency systems or the speed of sound for acoustic systems). The round trip time of flight is defined as the propagation time of the signal from the transmitting element 120-$i$ to the mobile node 170 and back to the receiving element 120-$j$ via the respective line-of-sight (LOS) paths, e.g. 190.

For a time-synchronised positioning system 100 in which the mobile node 170 has a clock that is synchronised with the clock at the master node 110, the round trip time of flight is the difference between the ToA of a signal at the receiving element 120-$j$ and the transmit time of that signal at the transmitting element 120-$i$, less the receive and transmit propagation delays within the transceiver of the mobile node 170, the receiving element 120-$j$, and the transmitting element 120-$i$. The propagation delays are predetermined by prior calibration. In the more typical case where the master node 110 and mobile node 170 are not time-synchronised, the round trip time of flight may still be estimated using a more elaborate scheme of signal transmission and reception, as described below.

The SPU 130 of the master node 110 is further configured to process the estimated round trip distances to estimate the location of the mobile node 170 in the manner to be described below with reference to FIG. 4.

According to a second embodiment, each element 120-$n$ in the antenna array 180 is a transceiver element. The mobile node 170 is configured to measure the ToA of a signal received from each transceiver element 120-$n$ in the antenna array 180. Each transceiver element 120-$n$ is configured to measure the ToA of a signal transmitted by the mobile node 170 in response to the signal received from that transceiver element 120-$n$. The ToA is measured at each transceiver element 120-$n$ relative to a common master clock at the master node 110, which requires all the transceiver elements 120-$n$ to be time-synchronised. The ToA measurements from a transceiver element 120-$n$ and the mobile node 170 are used by the SPU 130 to estimate the round trip distance of a signal from the transceiver element 120-$n$ to the mobile node 170 and back to that transceiver element 120-$n$. As in the first embodiment, the round trip distances may be estimated even if the transceiver elements 120-$n$ are not time-synchronised with the mobile node 170 in the manner described below. The SPU 130 is further configured to process the estimated round trip distances to estimate the location of the mobile node 170 in the manner to be described below with reference to FIG. 4.

A third embodiment is similar to the first embodiment, except that each receiving element 120-$j$ in the antenna array 180 is also configured to measure the phase of the signal transmitted by the mobile node 170 in response to the signal received from the single transmitting element 120-$i$. The phase is measured relative to a common reference signal phase across all receiving elements 120-$j$, which requires all the receiving elements 120-$i$ to be time-synchronised. The SPU 130 is configured to process the measured phases in addition to the estimated round trip distances to estimate the location of the mobile node 170 in the manner to be described below with reference to FIG. 5.

A fourth embodiment is similar to the second embodiment, except that each transceiver element 120-$n$ in the antenna array 180 is also configured to measure the phase of signals transmitted by the mobile node 170 in response to the signals received from the transceiver elements 120-$n$. The phase is measured relative to a common reference signal phase across all transceiver elements 120-$n$, which requires all the transceiver elements 120-$n$ to be time-synchronised. The SPU 130 is configured to process the phase measurements in addition to the estimated round trip distances to estimate the location of the mobile node 170 in the manner to be described below with reference to FIG. 5. The phase measurement from each transceiver element 120-$n$ used to estimate the location of the mobile node 170 could be a single measurement from a signal transmitted by the mobile node 170, or the average of the phase measurements over all signals transmitted by the mobile node 170.

Figure 2:
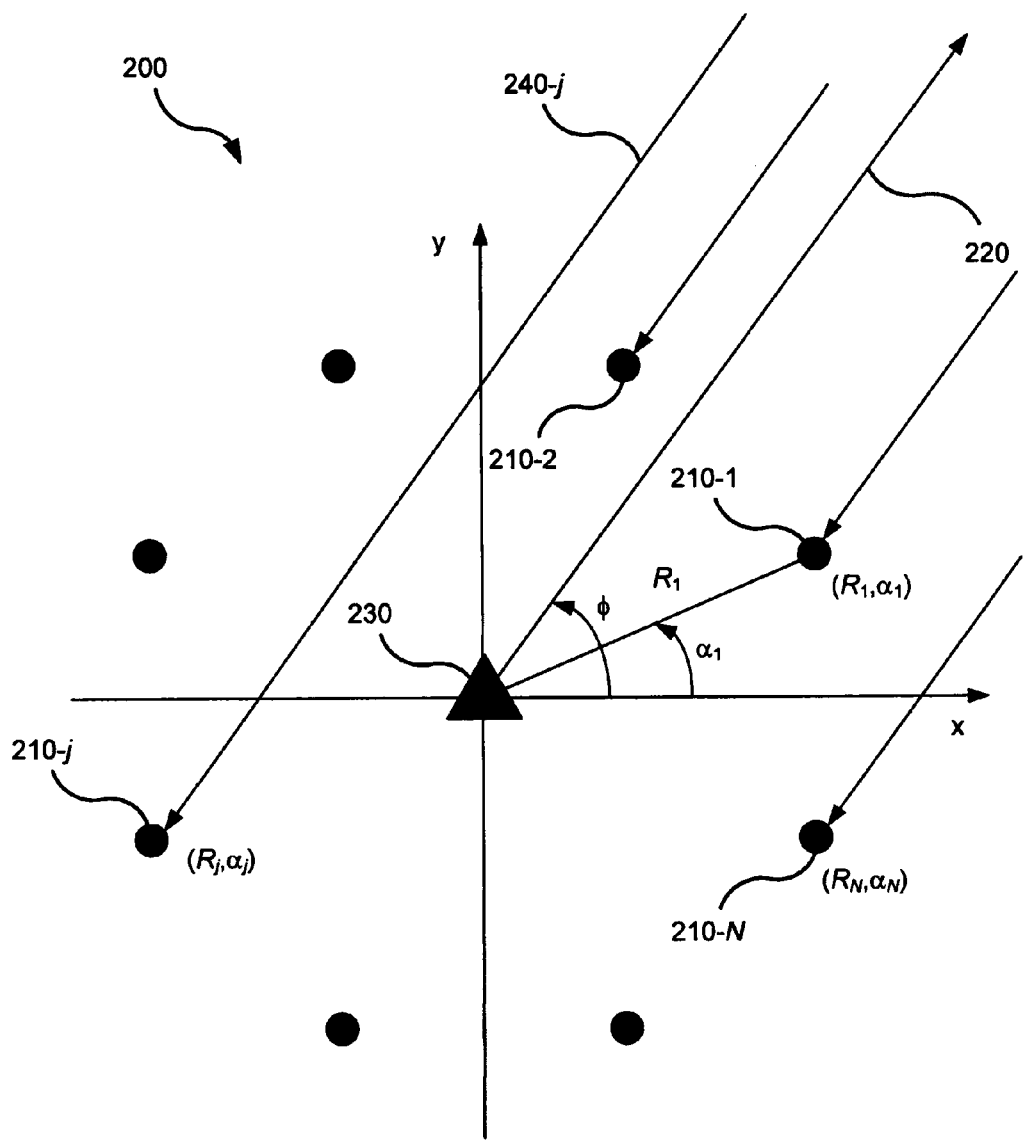
FIG. 2 illustrates an array of antenna elements that may be used as the antenna array at the master node in the system of FIG. 1 according to first and third embodiments.

FIG. 2 illustrates an array 200 of antenna elements that may be used as the array 180 at the master node 110 in the system 100 of FIG. 1 according to the first and third embodiments. The "receive-only" array 200 comprises single transmitting element 230 at the centre of a 2D array of N receiving elements 210-$j$. The transmitting element 230 may be identified with the transmitting element 120-$i$ in the array 180, while the receiving elements 210-$j$ may be identified with the receiving elements 120-$j$.

The array 200 is illustrated as a uniform circular array with the transmitting element 230 at the centre of the circle, but other array configurations may be used, e.g.: a uniform linear array with the transmitting element 230 at the centre; a non-uniform linear array; a dual concentric uniform circular array with the transmitting element 230 at the centre; and a non-uniform circular or dual concentric circular array with the transmitting element 230 at the centre.

The reference point 165 for localisation is the location of the transmitting element 230. Each receiving element 210-$j$ is located in polar coordinates at $(R_j, \alpha_j)$ in relation to the reference point 165. The mobile node 170 is likewise located at $(l_0, \phi)$. The transmitting element 230 transmits a signal represented by the arrow 220 to the mobile node 170, which responds with a signal that is represented on arrival at the receiving element 210-$j$ by the arrow 240-$j$. The round trip distance $r_j$ for the j-th receiving element 210-$j$ is the sum of the distance $l_0$ from the transmitting element 230 to the mobile node 170 and the distance $l_j$ from the mobile node 170 to the j-th receiving element 210-$j$. The phase of the received signal as measured at the j-th receiving element 210-$j$ according to the third embodiment is denoted as $\beta_j \in [-\pi, \pi)$.

Figure 3:
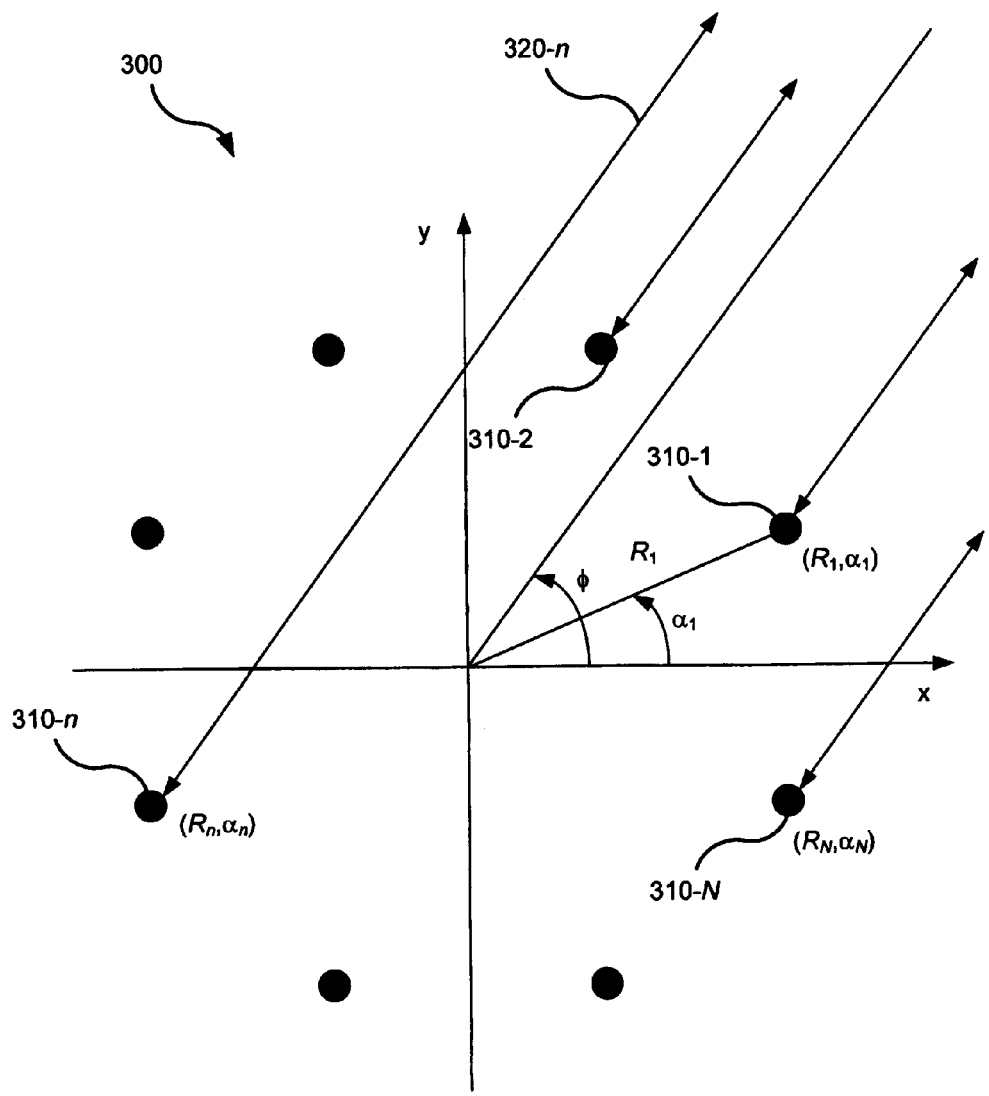
FIG. 3 illustrates an array of antenna elements that may be used as the antenna array at the master node in the system of FIG. 1 according to second and fourth embodiments.

FIG. 3 illustrates an array 300 of antenna elements that may be used as the array 180 at the master node 110 in the system 100 of FIG. 1 according to the second and fourth embodiments. The "transceiver" array 300 comprises a 2D array of N transceiver elements 310-$n$. The transceiver elements 310-$n$ may be identified with the transceiver elements 120-$n$ in the array 180. The reference point 165 for localisation is the centre of the 2D array. Each transceiver element 310-$n$ is located in polar coordinates at $(R_n, \alpha_n)$ in relation to the reference point 165. Each transceiver element 310-$n$ transmits a signal represented by the bidirectional arrow 320-$n$ to the mobile node 170, which responds with a signal also represented by the arrow 320-$n$. The round trip distance $r_n$ for the n-th transceiver element 310-$n$ is twice the distance $l_n$, from the mobile node 170 to the n-th transceiver element 310-$n$. The phase of the received signal as measured at the n-th transceiver element 310-$n$ according to the fourth embodiment is denoted as $\beta_n \in [-\pi, \pi)$.

The array 300 is illustrated as a uniform circular array, but as for the array 200, other array configurations may be used.

A scheme for measuring the round trip distance $l_A+l_C$ between a transmitting element, labelled as A, and a receiving element, labelled as C, both located at the master node, via a mobile node, labelled as B, is now described. The time at which the signal is transmitted by the transmitting element A is denoted as $t_1$. The transmitted signal arrives in the receiving electronics of the mobile node B at a ToA denoted as $t_2$, where $t_2$ is given by $$t_2 = t_1 + \Delta_A^{tx} + \frac{l_A}{c} + \Delta_B^{rx}$$

for propagation delays $\Delta_A^{tx}$ and $\Delta_B^{rx}$ in the transmitting element and mobile node respectively, where c is the wireless signal propagation speed. The mobile node B then transmits a signal at a later time denoted as $t_3$. The signal arrives at the receiving electronics of the receiving element C at a ToA denoted as $t_4$, where $t_4$ is given by $$t_4 = t_3 + \Delta_B^{tx} + \frac{l_C}{c} + \Delta_C^{rx}$$

for propagation delays $\Delta_B^{tx}$ and $\Delta_C^{rx}$ in the mobile node and receiving element respectively.

The relationship between the (unknown) true time $t_x$ of an event x and the time of that event measured at the local clock of a node j is $t_x^j = \alpha^j(t_x - t_0^j)$, where $\alpha^j$ is the relative frequency (typically within 1 ppm of unity for temperature compensated crystal oscillators) and $t_0^j$ is the time offset of the local clock. The elements A and C are time-synchronised, so events associated with elements A and C will be denoted by a common superscript M (for master node), and events associated with the mobile node B will be denoted by a superscript T (for tag). The measured round trip time $T_{ABC}$ is $$T_{ABC} = (t_4^M - t_3^T) + (t_2^T - t_1^M)$$

which may be satisfactorily approximated as $$T_{ABC} \approx (\alpha_M - \alpha_T)(t_3 - t_1) + \frac{l_A + l_C}{c} + \Delta_B^{rx} + \Delta_C^{rx} + \Delta_A^{tx} + \Delta_B^{tx}$$

The relative frequency difference $\alpha_M - \alpha_T$ can be determined using multiple transmissions between the master node and the mobile node, the propagation delays are predetermined by prior calibration, and the transmission time difference $t_3 - t_1$ can be readily estimated to sufficient accuracy as $t_4^M - t_1^M$, i.e. ignoring the propagation time and propagation delays. Hence the round trip time of flight is readily estimated as $$\frac{l_A + l_C}{c} = T_{ABC} - (\alpha_M - \alpha_T)(t_4^M - t_1^M) - \Delta_B^{tx} - \Delta_C^{rx} - \Delta_A^{tx} - \Delta_B^{rx}$$

As mentioned above, the round trip distance $l_A+l_C$ can then be estimated by multiplying the round trip time of flight estimate by the propagation speed c.

For all embodiments, the mobile node B is the mobile node 170. For the first and third embodiments, the transmitting element A is the transmitting element 230 and the receiving element C is each receiving element 210-j, and the round trip distance $l_A+l_C$ is $l_0+l_j$. For the second and fourth embodiments, the transmitting element A and the receiving element C are the same transceiver element 310-n, and the round trip distance $l_A+l_C$ is $2l_n$.

A general "brute force" method for estimating the location of the mobile node 170 according to the four embodiments is now described. Assuming that the measurement errors are independent and Gaussian distributed, which is a reasonable assumption for line-of-sight signal transmission, the location of the mobile node 170 can be estimated by minimising a two-parameter cost function.

According to the third embodiment, given the round trip distance and phase measurements $r_j$ and $\beta_j$ obtained by the N receiving elements 210-j, the cost function $C_3$ embodiment can be constructed as $$C_3(l_0, \phi) = \frac{1}{\sigma_R^2} \sum_{j=1}^{N} \left( l_0 + \sqrt{(l_0\cos\phi - R_j\cos\alpha_j)^2 + (l_0\sin\phi - R_j\sin\alpha_j)^2} - r_j \right)^2 + \frac{1}{\sigma_P^2} \sum_{j=1}^{N} \left[ \frac{2\pi}{\lambda}\left(l_0 - \sqrt{(l_0\cos\phi - R_j\cos\alpha_j)^2 + (l_0\sin\phi - R_j\sin\alpha_j)^2}\right) - \beta_j \right]_{[-\pi,\pi)}^2 \quad (1)$$

where $\sigma_R^2$ is the variance of the errors in the round trip distance measurements $r_j$, $\sigma_P^2$ is the variance of the errors in the phase measurements $\beta_j$ and the notation $[\bullet]_{[-\pi,\pi)}$ means that the subtraction must be restrained to the interval $[-\pi,\pi)$ by a modulo-$2\pi$ operation.

The cost function $C_1$ according to the first embodiment is the same as the cost function $C_3$ of equation (1) according to the third embodiment, without the second, phase-related term.

According to the fourth embodiment, given the round trip distance and phase measurements $r_n$ and $\beta_n$ obtained by the N transceiver elements 310-n, the cost function $C_4$ can be constructed as $$C_4(l_0, \phi) = \frac{1}{\sigma_R^2} \sum_{n=1}^{N} \left( 2\sqrt{(l_0\cos\phi - R_n\cos\alpha_n)^2 + (l_0\sin\phi - R_n\sin\alpha_n)^2} - r_n \right)^2 + \frac{1}{\sigma_P^2} \sum_{j=1}^{N} \left[ \frac{2\pi}{\lambda}\left(l_0 - \sqrt{(l_0\cos\phi - R_n\cos\alpha_n)^2 + (l_0\sin\phi - R_n\sin\alpha_n)^2}\right) - \beta_n \right]_{[-\pi,\pi)}^2 \quad (2)$$

The cost function $C_2$ according to the second embodiment is the same as the cost function $C_4$ of equation (2) according to the fourth embodiment, without the second, phase-related term.

The location of the mobile node 170 according to each embodiment may then be estimated as the minimising argument of the corresponding cost function:

$$(\hat{l}_0, \hat{\phi}) = \underset{l_0, \phi}{\operatorname{argmin}} C_k(l_0, \phi) \quad (3)$$

where k=1, 2, 3, or 4. The 2D minimization in equation (3) can be performed using conventional optimisation techniques such as the simplex search method.

More efficient methods of estimating the location of the mobile node 170 are now described. For the "receive-only" array 200 according to the first embodiment illustrated in FIG. 2, and assuming "far-field" conditions, i.e. $l_0 \gg R_j$, the relationship between the location $(l_0, \phi)$ of the mobile node 170 and the round trip distance $l_0 + l_j$ from the transmitting element 230 to the j-th receiving element 210-*j* may be written as $$2l_0 - R_j \cos(\phi - \alpha_j) = l_j + l_0 \qquad (4)$$

Over all N receiving elements 210-*j*, a linear equation may thus be written:

$$A_1 \begin{pmatrix} l_0 \\ \cos\phi \\ \sin\phi \end{pmatrix} - r = \Delta r \qquad (5)$$

where r is an N-vector of round trip distance measurements $r_j$, $\Delta r$ is a vector of distance measurement errors $\Delta r_j$, and $A_1$ is an N-by-3 "array matrix" given by $$A_1 = \begin{pmatrix} 2 & -R_1 \cos\alpha_1 & -R_1 \sin\alpha_1 \\ \vdots & \vdots & \vdots \\ 2 & -R_N \cos\alpha_N & -R_N \sin\alpha_N \end{pmatrix} \qquad (6)$$

The least-squares solution of the linear equation (5) is given by $$\begin{pmatrix} \hat{l}_0 \\ \hat{c} \\ \hat{s} \end{pmatrix} = (A_1^T A_1)^{-1} A_1^T r \qquad (7)$$

where $\hat{l}_0$ is the estimated range, and the estimated bearing $\hat{\phi}$ is given by $$\hat{\phi} = \arg\{\hat{c} + j\hat{s}\} \qquad (8)$$

For the "transceiver" array 300 according to the second embodiment illustrated in FIG. 3, the same approach may be used, except that the relationship (4) between the location $(l_0, \phi)$ of the mobile node 170 and the round trip distance $2l_n$ to the n-th transceiver element 310-*n* is written as $$2l_0 - 2R_n \cos(\phi - \alpha_n) = 2l_n \qquad (9)$$

Over all N receiving elements 310-*n*, a linear equation may thus be written:

$$A_2 \begin{pmatrix} l_0 \\ \cos\phi \\ \sin\phi \end{pmatrix} - r = \Delta r \qquad (10)$$

where the array matrix $A_2$ is defined as $$A_2 = 2 \begin{pmatrix} 1 & -R_1 \cos\alpha_1 & -R_1 \sin\alpha_1 \\ \vdots & \vdots & \vdots \\ 1 & -R_N \cos\alpha_N & -R_N \sin\alpha_N \end{pmatrix} \qquad (11)$$

The least squares solution of the linear equation (10) is therefore given by equation (7), with $A_1$ replaced by $A_2$.

Figure 4:
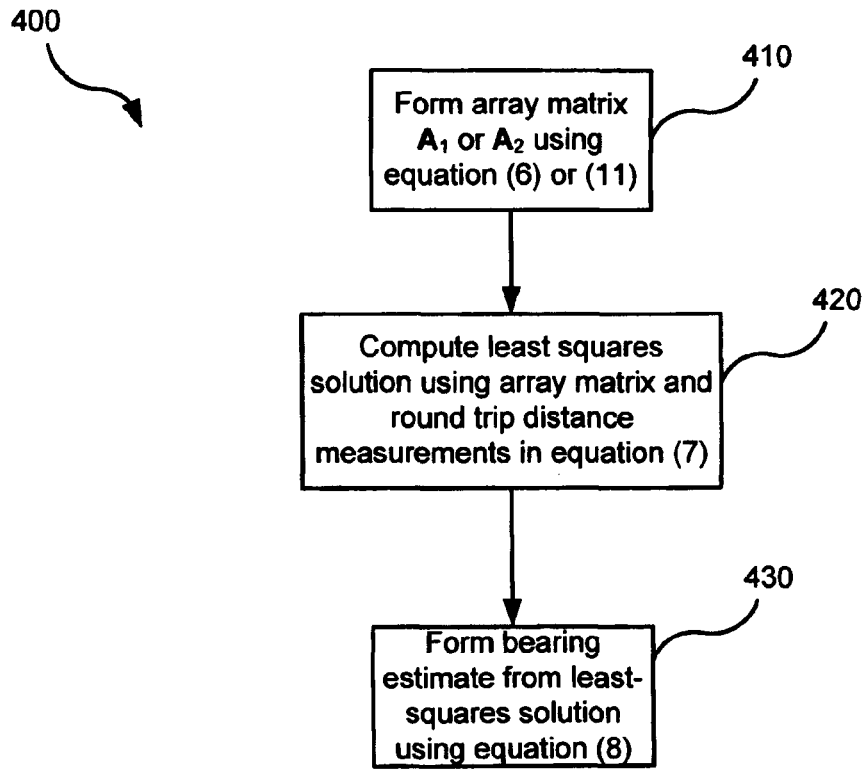
FIG. 4 is a flow chart illustrating a method of estimating the range and location of the mobile node using only round trip distance measurements acquired using the array according to the first or second embodiment illustrated in FIG. 2 or FIG. 3.

FIG. 4 is a flow chart illustrating a method 400 of estimating the range and location of the mobile node using only round trip distance measurements acquired using the array 200 or 300 according to the first or second embodiment. The method 400 is carried out by the SPU 130 of the master node 110.

The method 400 starts at step 410, at which the array matrix $A_1$ or $A_2$ is formed using equation (6) or (11). At the next step 420, the method 400 computes the least-squares solution to the linear equation (5) or (10) using the array matrix $A_1$ or $A_2$ and the round trip distance measurements $r_j$ or $r_n$ according to equation (7). Finally, at step 430, the method 400 forms an estimate $\hat{\phi}$ of the bearing of the mobile node 170 from the least-squares solution using equation (8). The method 400 then concludes.

For the "receive-only" array 200 according to the third embodiment illustrated in FIG. 2, and assuming "far-field" conditions, i.e. $l_0 \gg R_j$, the relationship between the bearing $\phi$ of the mobile node 170 and the phase measurements $\beta_{j-1}$ and $\beta_j$ at the (j−1)-th and j-th receiving elements 210-(*j*−1) and 210-*j* respectively may be written as $$\frac{2\pi}{\lambda}(R_j \cos(\alpha_j - \phi) - R_{j-1} \cos(\alpha_{j-1} - \phi)) - 2\pi k_j = \beta_j - \beta_{j-1} \qquad (12)$$

where $\lambda$ is the wavelength of the received signal and $k_j$ is an integer that embodies the ambiguity of the measured phase $\beta_j$, which is restricted to the interval $[-\pi, \pi)$.

Over all N receiving elements 210-*j*, a linear equation may thus be written:

$$B \begin{pmatrix} \cos\phi \\ \sin\phi \end{pmatrix} - 2\pi k - \delta = \Delta\delta \qquad (13)$$

where $\delta$ is an N-vector with each entry being the phase difference $\beta_{j-1} - \beta_j$ between two adjacent transceiver elements 210-(*j*−1) and 210-*j* in the array 200, k is an N-vector of integers $k_j$, $\Delta\delta$ is an N-vector of phase difference errors, and B is an N-by-2 "phase array matrix" given by $$B = \frac{2\pi}{\lambda} \begin{pmatrix} R_1 \cos\alpha_1 - R_N \cos\alpha_N & R_1 \sin\alpha_1 - R_N \sin\alpha_N \\ R_2 \cos\alpha_2 - R_1 \cos\alpha_1 & R_2 \sin\alpha_2 - R_1 \sin\alpha_1 \\ \vdots & \vdots \\ R_N \cos\alpha_N - R_{N-1} \cos\alpha_{N-1} & R_N \sin\alpha_N - R_{N-1} \sin\alpha_{N-1} \end{pmatrix} \qquad (14)$$

Assuming that each component in the distance error vector $\Delta r$ is independent with variance $\sigma_R^2$ and each component in the phase difference error vector $\Delta\delta$ is also independent with variance $\pi_\Delta^2$, the joint distance/phase weighted least squares solution to equations (10) and (13) is given by $$\begin{pmatrix} \hat{l}_0 \\ \hat{c} \\ \hat{s} \end{pmatrix} = \left( \frac{1}{\sigma_R^2} A_1^T A_1 + \frac{1}{\sigma_\Delta^2} \begin{pmatrix} 0 & 0 \\ 0 & B^T B \end{pmatrix} \right)^{-1} \left( \frac{1}{\sigma_R^2} A_1^T r + \frac{1}{\sigma_\Delta^2} \begin{pmatrix} 0 \\ B^T (2\pi k + \delta) \end{pmatrix} \right) \qquad (15)$$

where the integer vector k is first obtained by resolving the phase ambiguity as described below. Equation (8) may then be used to estimate the bearing $\phi$ of the mobile node 170.

For the "transceiver" array 300 according to the fourth embodiment illustrated in FIG. 3, the same approach as for the third embodiment may be used, except that the matrix $A_2$ of equation (11) is used in place of the matrix $A_1$ in equation (15).

The incorporation of phase measurements, as in the third and fourth embodiments, allows the bearing φ to be estimated with much greater accuracy compared to only using round trip distances, as in the first and second embodiments. However, the use of phase is potentially subject to ambiguity. If any two adjacent elements 120-(n−1) and 120-n in the array 180 are spaced closely enough, for example, approximately half a wavelength λ, there is no phase ambiguity, i.e. k=0 in equations (13) and (15). However, as mentioned above, the wider the aperture, the better is the resolution of the bearing estimate. For a given array aperture width (e.g. diameter of the circular arrays 200 and 300), element spacing this close will require a large number of elements 120-n in the array 180 and hence increase the complexity of the positioning system according to the third and fourth embodiments.

To accommodate transceiver element spacing greater than half a wavelength λ, the ambiguity in the phase measurements $\beta_n$ needs to be resolved. In one implementation, the phase ambiguity is resolved using as an initial bearing estimate $\hat{\phi}_0$ the bearing estimate $\hat{\phi}$ obtained using only the round trip distance measurements $r_n$, as in the method 400 according to the first and second embodiments. The integer vector k can then be determined using equation (13) as $$k = \frac{1}{2\pi}\left(B\begin{pmatrix}\cos\hat{\phi}_0\\ \sin\hat{\phi}_0\end{pmatrix} - \left[B\begin{pmatrix}\cos\hat{\phi}_0\\ \sin\hat{\phi}_0\end{pmatrix}\right]_{[-\pi,\pi)}\right) \quad (16)$$

where the notation $[\bullet]_{[-\pi,\pi)}$ has the same meaning as previously. The determined value of k can then be used in equation (15) to estimate the range and bearing of the mobile node 170.

Note that, since the round trip distance measurements $r_n$ have limited precision, the initial bearing estimate $\hat{\phi}_0$ itself may not be accurate and unresolved ambiguity may still be present. However, if the number N of elements 120-n in the array 180 satisfies a minimum condition, the ambiguity in the initial bearing estimate $\hat{\phi}_0$ can be removed. To obtain the minimum condition, the width of the aperture of the antenna array 180 is denoted as D, and the angle at which the plane wave signal received from the mobile node 170 is incident on the aperture as θ. The ends of the aperture are therefore separated by a distance D sin θ in the direction normal to the planar wavefront. This results in a time delay of D sin θ/c, or equivalently a phase offset of $$\frac{2\pi}{\lambda}D\sin\theta,$$

between the planar wavefront reaching an element at one end of the aperture and its reaching an element at the other end.

For a linear array 180 with element spacing d, the width D of the aperture is (N−1)d. For a plane wave parallel to the aperture (θ=0) and for a distance error of $\sigma_R$ at one end of the aperture compared to the other end, the angular error $\theta_R$, which is the resolution of the bearing estimate using distance alone, is given by $$\theta_R = \arcsin\left(\frac{\sigma_R}{D}\right) \approx \frac{\sigma_R}{D}$$

If the element spacing d is selected such that the phase difference between two adjacent transceiver elements due to a signal bearing of $\theta_R$ is less than π radians, i.e.

$$\frac{2\pi d \sin\theta_R}{\lambda} < \pi$$

then the phase ambiguity can be resolved using the round trip distance measurements, and hence bearing can be unambiguously estimated using phase measurements over the array 180. This condition requires that the element spacing d must satisfy $$d < \frac{\lambda}{2\sin\theta_R} = \frac{\lambda D}{2\sigma_R}$$

or equivalently $$\frac{D}{d} = N - 1 > \frac{2\sigma_R}{\lambda}$$

Consequently, the number of elements N in a linear array must satisfy $$N > \frac{2\sigma_R}{\lambda} + 1$$

regardless of the length of the array. For example, for a 5.8 GHz carrier frequency and $\sigma_R$=0.1 m, the minimum number of elements N in a linear array is 5.

For a uniform circular array 180, the circumference is approximately Nd, and hence the width D of the aperture is approximately Nd/π. The number of elements N must therefore satisfy $$N = \frac{\pi D}{d} > \frac{2\pi\sigma_R}{\lambda}$$

For the above example of a 5.8 GHz carrier frequency and $\sigma_R$=0.1 m, the minimum number of elements N in a circular array is 13.

In short, for the phase ambiguity to be resolvable using the round trip distance measurements, the angular uncertainly resulting from the round trip distance measurement uncertainty across the array must result in a phase change between adjacent elements of less than π radians.

Figure 5:
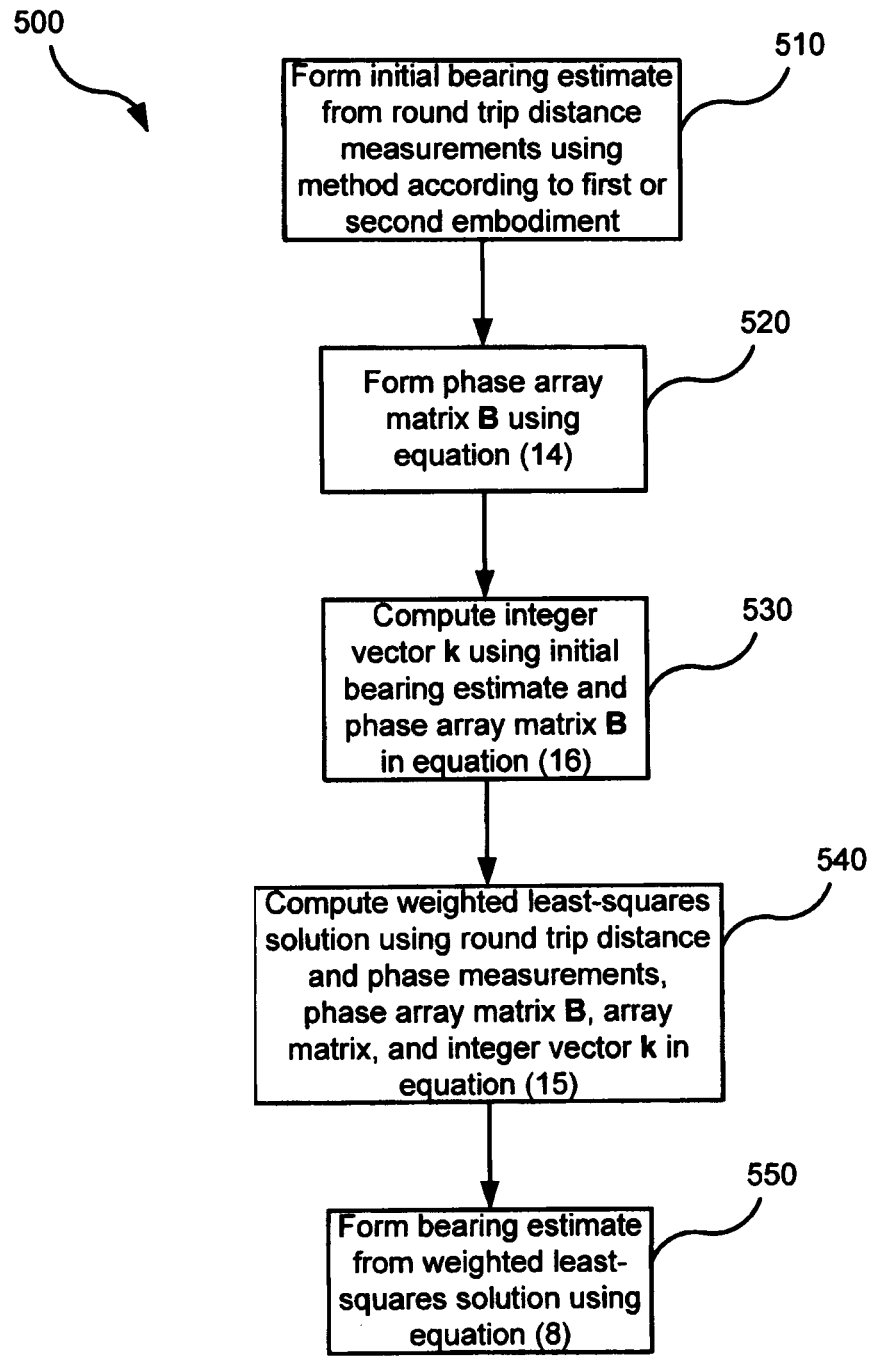
FIG. 5 is a flow chart illustrating a method of estimating the range and location of the mobile node using round trip distance and phase measurements acquired using the array according to the third or fourth embodiment illustrated in FIG. 2 or FIG. 3.

FIG. 5 is a flow chart illustrating a method 500 of estimating the range and location of the mobile node 170 using round trip distance and phase measurements acquired using the array 200 or 300 according to the third or fourth embodiment illustrated in FIG. 2 or FIG. 3. The method 500 is carried out by the SPU 130 of the master node 110.

The method 500 starts at step 510, which computes an initial estimate $\hat{\phi}_0$ of the bearing of the mobile node 170 using only the round trip distance measurements $r_j$ or $r_n$ from the receiving elements 210-j or transceiver elements 310-n using the method 400 according to the first or second embodiment as described above with reference to FIG. 4. At the next step 520, the method 500 forms the phase array matrix B according to equation (14). Step 530 follows, at which the method 500 computes an integer vector k using the initial bearing estimate $\hat{\phi}_0$ and the phase array matrix B in equation (16). The method 500 then proceeds to step 540, which computes a weighted least-squares solution using round trip distance measurements $r_j$ or $r_n$, the phase measurements $\beta_j$ or $\beta_n$, the array matrix $A_1$ or $A_2$, the phase array matrix B and the integer vector k in equation (15). Finally, the method 500 forms an estimate $\hat{\phi}$ of the bearing of the mobile node 170 from the weighted least-squares solution using equation (8). The method 500 then concludes.

An alternative method for resolving the phase ambiguity in the phase measurements $\beta_n$ in the third and fourth embodiments is to search for multiple peaks located around $\hat{\phi}_0$ in the pattern $P(\phi)$ of the array 300, defined as $$P(\phi) = \left| \sum_{n=1}^{N} \exp\left\{ j \left[ \beta_n - \frac{2\pi}{\lambda} (R_n \cos\alpha_n \cos\phi + R_n \sin\alpha_n \sin\phi) \right] \right\} \right| \quad (17)$$

The multiple peaks result from phase ambiguity. The number K of peaks is proportional to the spacing of the elements 120-n in the array 180, in that for each half wavelength of spacing, another peak appears. For example, for an element spacing of five wavelengths, the value of K is ten.

The K bearing estimates corresponding to the K peaks around $\hat{\phi}_0$ in $P(\phi)$ are denoted as $\hat{\phi}_0^{(i)}$ (i=1, ..., K) each producing an integer vector $k^{(i)}$ calculable by equation (16). For each integer vector $k^{(i)}$, a weighted least squares solution $$\begin{pmatrix} \hat{l}_0^{(i)} \\ \hat{c}^{(i)} \\ \hat{s}^{(i)} \end{pmatrix}$$

is calculated using equation (15), and an estimation error vector $e^{(i)}$ is obtained as $$e^{(i)} = \begin{pmatrix} A_1 \\ (0\ B) \end{pmatrix} \begin{pmatrix} \hat{l}_0^{(i)} \\ \hat{c}^{(i)} \\ \hat{s}^{(i)} \end{pmatrix} - \begin{pmatrix} r \\ 2\pi k^{(i)} + \delta \end{pmatrix} \quad (18)$$

for the third embodiment. For the fourth embodiment, the array matrix $A_2$ is used in (18) in place of $A_1$.

The chosen solution is thus the vector $$\begin{pmatrix} \hat{l}_0^{(i)} \\ \hat{c}^{(i)} \\ \hat{s}^{(i)} \end{pmatrix}$$

yielding the smallest weighted square error $E_i$, where $$E_i = e^{T(i)} \begin{pmatrix} \frac{1}{\sigma_R^2} & 0 \\ 0 & \frac{1}{\sigma_\Delta^2} \end{pmatrix} e^{(i)} \quad (19)$$

Figure 6:
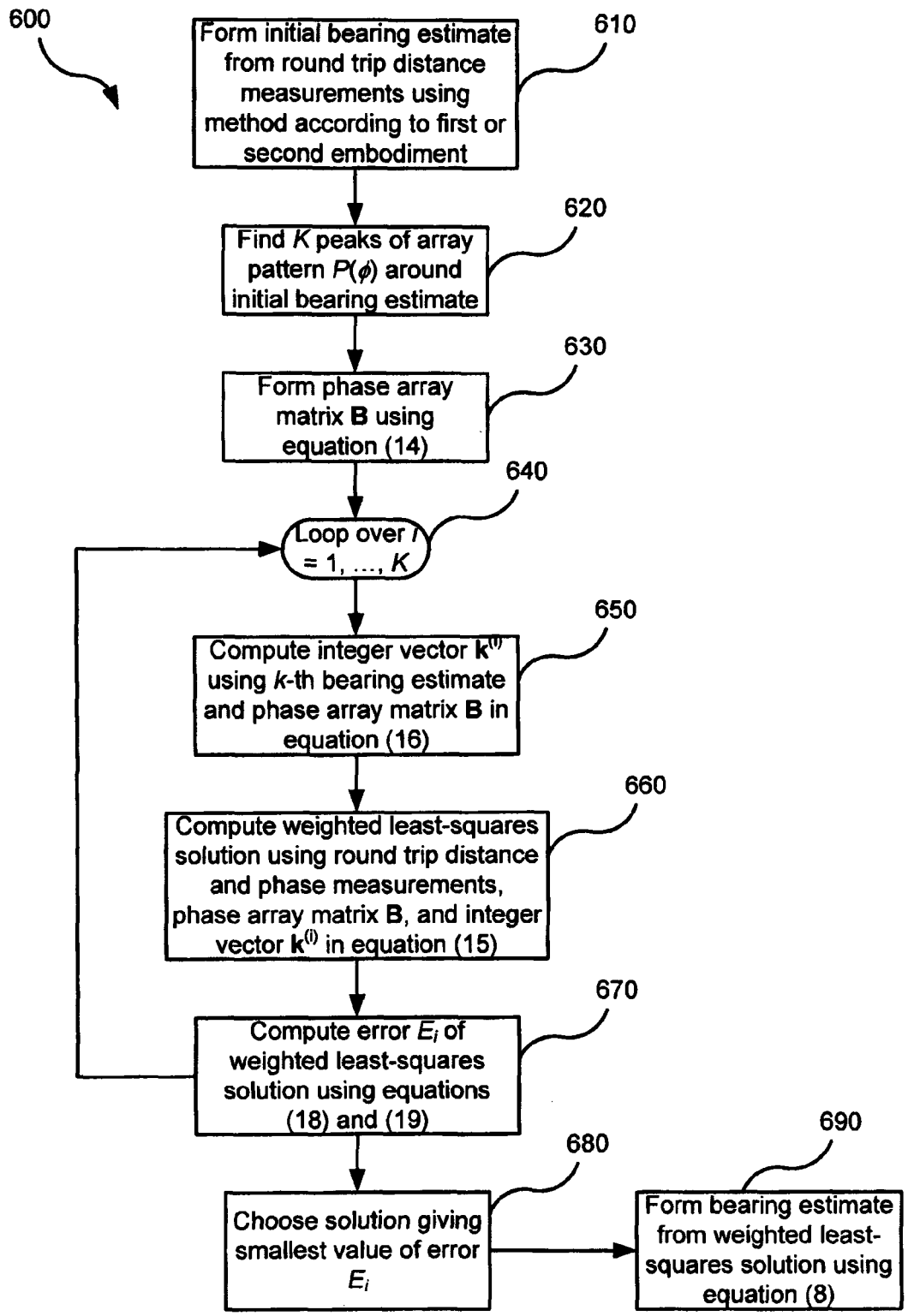
FIG. 6 is a flow chart illustrating an alternative method of estimating the range and location of the mobile node using round trip distance and phase measurements acquired using the array according to the third or fourth embodiment illustrated in FIG. 2 or FIG. 3.

FIG. 6 is a flow chart illustrating an alternative method 600 of estimating the range and location of the mobile node 170 using round trip distance and phase measurements acquired using the array 200 or 300 according to the third or fourth embodiment illustrated in FIG. 2 or FIG. 3. The method 600 is carried out by the SPU 130 of the master node 110.

The method 600 starts at step 610, which computes an initial estimate $\hat{\phi}_0$ of the bearing of the mobile node 170 using only the round trip distance measurements $r_j$ or $r_n$ from the receiving elements 210-j or transceiver elements 310-n using the method 400 according to the first or second embodiment as described above with reference to FIG. 4. At the next step 620, the method 600 finds the K largest peaks located around $\hat{\phi}_0$ in the pattern $P(\phi)$ of the array 300, as defined in equation (17). The location of each peak is a bearing estimate $\hat{\phi}_0^{(i)}$, i=1, ..., K. Step 630 follows, at which the method 600 forms the phase array matrix B according to equation (14).

Steps 640 initiates a loop over the K bearing estimates $\hat{\phi}_0^{(i)}$, so that steps 650 to 670 are carried out for each bearing estimate $\hat{\phi}_0^{(i)}$. At step 650, the method 600 computes an integer vector $k^{(i)}$ using the bearing estimate $\hat{\phi}_0^{(i)}$ and the phase array matrix B in equation (16). At the next step 660, a weighted least squares solution $$\begin{pmatrix} \hat{l}_0^{(i)} \\ \hat{c}^{(i)} \\ \hat{s}^{(i)} \end{pmatrix}$$

is computed using the round trip distance measurements $r_j$ or $r_n$, the phase measurements $\beta_j$ or $\beta_n$, the array matrix $A_1$ or $A_2$, the phase array matrix B, and the integer vector $k^{(i)}$ in equation (15). Step 670 follows, at which the method 600 computes an error $E_i$ of the weighted least squares solution $$\begin{pmatrix} \hat{l}_0^{(i)} \\ \hat{c}^{(i)} \\ \hat{s}^{(i)} \end{pmatrix}$$

using equations (18) and (19). After all K weighted least squares solutions $$\begin{pmatrix} \hat{l}_0^{(i)} \\ \hat{c}^{(i)} \\ \hat{s}^{(i)} \end{pmatrix}$$

and errors $E_i$ have been computed, the method 600 at step 680 chooses the weighted least squares solution $$\begin{pmatrix} \hat{l}_0^{(i)} \\ \hat{c}^{(i)} \\ \hat{s}^{(i)} \end{pmatrix}$$

yielding the smallest error $E_i$. Finally, at step 690 the method 600 forms an estimate $\hat{\phi}$ of the bearing of the mobile node 170 from the chosen weighted least-squares solution using equation (8). The method 600 then concludes.

Figure 7:
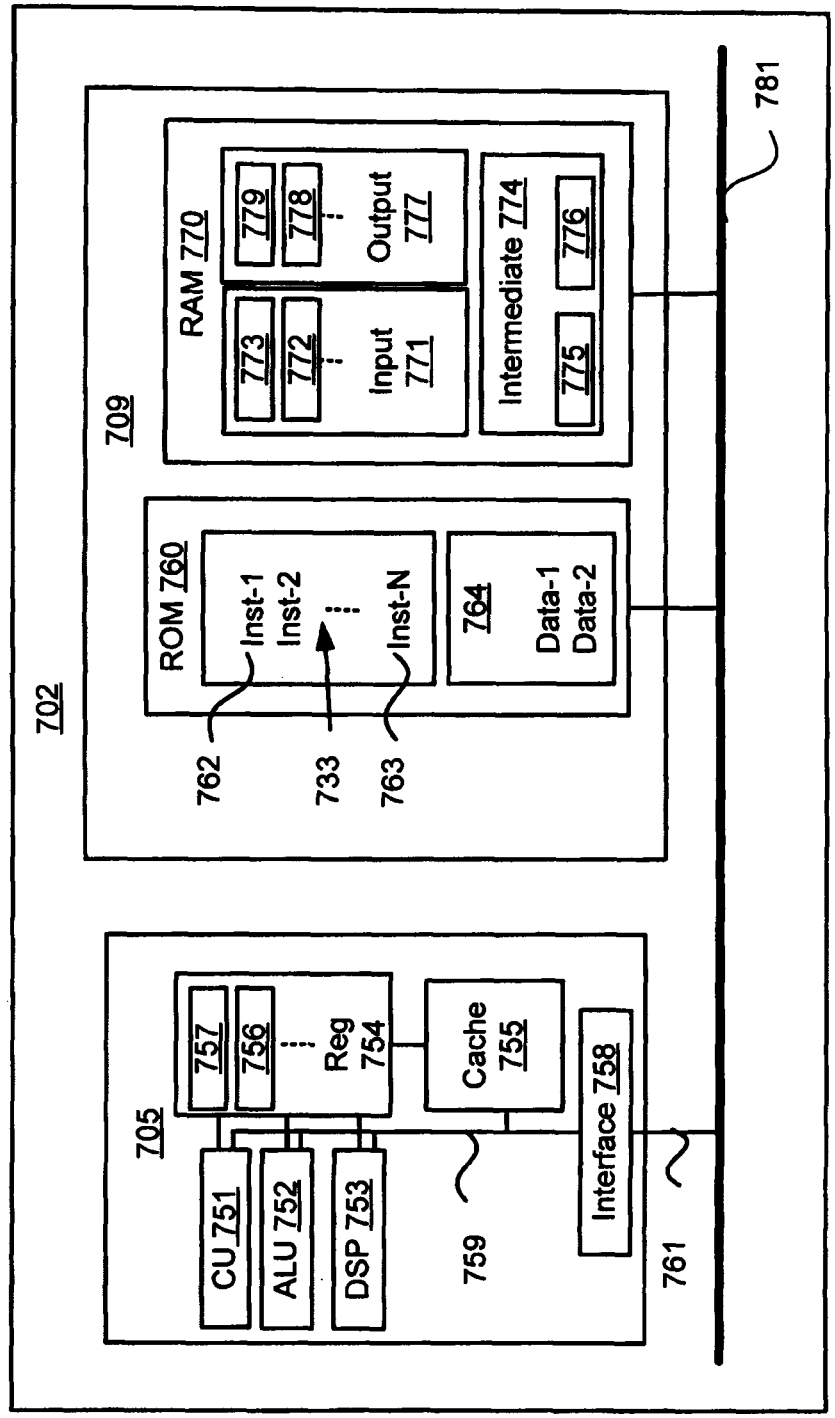
FIG. 7 is a schematic block diagram representation of a device that may be used to implement the signal processing unit in the system of FIG. 1.

FIG. 7 is a schematic block diagram representation of a device that may be used to implement the signal processing unit 130 in the system of FIG. 1. The device 702 incorporates a processor 705 bidirectionally coupled to an internal storage module 709. The storage module 709 may be formed from non-volatile semiconductor read only memory (ROM) 760 and semiconductor random access memory (RAM) 770. The RAM 770 may be volatile, non-volatile or a combination of volatile and non-volatile memory.

The methods described above may be implemented as one or more software programs 733 executable within the device 702. In particular, with reference to FIG. 7, the steps of the described methods are effected by instructions in the software 733 that are carried out within the device 702. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 733 of the device 702 is typically stored in the non-volatile ROM 760 of the internal storage module 709. The software 733 can be loaded into and executed by the processor 705. In some instances, the processor 705 may execute software instructions that are located in RAM 770. Software instructions may be loaded into the RAM 770 by the processor 705 initiating a copy of one or more code modules from ROM 760 into RAM 770. Alternatively, the software instructions of one or more code modules may be pre-installed in a non-volatile region of RAM 770 by a manufacturer. After one or more code modules have been located in RAM 770, the processor 705 may execute software instructions of the one or more code modules. The software 733 is typically pre-installed and stored in the ROM 760 by a manufacturer, prior to distribution of the device 702.

The processor 705 is able to execute the software 733 stored in one or both of the connected memories 760 and 770. When the device 702 is initially powered up, a system program resident in the ROM 760 is executed. The software 733 permanently stored in the ROM 760 is sometimes referred to as "firmware". Execution of the firmware by the processor 705 may fulfil various functions, including processor management, memory management, device management, storage management and user interface.

The processor 705 typically includes a number of functional modules including a control unit (CU) 751, an arithmetic logic unit (ALU) 752 and a local or internal memory comprising a set of registers 754 which typically contain atomic data elements 756, 757, along with internal buffer or cache memory 755. One or more internal buses 759 interconnect these functional modules. The processor 705 typically also has one or more interfaces 758 for communicating with external devices via system bus 781, using a connection 761.

The software 733 includes a sequence of instructions 762 though 763 that may include conditional branch and loop instructions. The program 733 may also include data, which is used in execution of the program 733. This data may be stored as part of the instruction or in a separate location 764 within the ROM 760 or RAM 770.

In general, the processor 705 is given a set of instructions, which are executed therein. This set of instructions may be organised into blocks, which perform specific tasks or handle specific events that occur in the device 702. Typically, the software 733 waits for events and subsequently executes the block of code associated with that event. Events may be triggered in response to input from a user, as detected by the processor 705.

The execution of a set of the instructions may require numeric variables to be read and modified. Such numeric variables are stored in the RAM 770. The disclosed method uses input variables 771 that are stored in known locations 772, 773 in the memory 770. The input variables 771 are processed to produce output variables 777 that are stored in known locations 778, 779 in the memory 770. Intermediate variables 774 may be stored in additional memory locations in locations 775, 776 of the memory 770. Alternatively, some intermediate variables may only exist in the registers 754 of the processor 705.

The execution of a sequence of instructions is achieved in the processor 705 by repeated application of a fetch-execute cycle. The control unit 751 of the processor 705 maintains a register called the program counter, which contains the address in ROM 760 or RAM 770 of the next instruction to be executed. At the start of the fetch execute cycle, the contents of the memory address indexed by the program counter is loaded into the control unit 751. The instruction thus loaded controls the subsequent operation of the processor 705, causing for example, data to be loaded from ROM memory 760 into processor registers 754, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described above is associated with one or more segments of the software 733, and is performed by repeated execution of a fetch-execute cycle in the processor 705 or similar programmatic operation of other independent processor blocks in the device 702.

The arrangements described are applicable to the wireless localisation industries.

The foregoing describes only some embodiments of the present invention, and modifications and/or changes can be made thereto without departing from the scope and spirit of the invention, the embodiments being illustrative and not restrictive.

The invention claimed is:

1. An apparatus for estimating the location of a remote node, the apparatus comprising:
   an antenna array comprising a plurality of elements in a fixed spatial arrangement, at least one element being a transmitting element configured to transmit a first wireless signal to the remote node, and at least two elements being receiving elements configured to receive a second wireless signal transmitted by the remote node in response to the first wireless signal, wherein the first wireless signal is used to measure a first time-of-arrival between the apparatus and the remote node and the second wireless signal is used to measure a second time-of-arrival between the remote node and the apparatus; and
   a signal processing unit connected to the antenna array, the signal processing unit being configured to:
      estimate a plurality of round trip distances using the first time-of-arrival and second time-of-arrival based on the first and second wireless signals, each round trip distance being from the transmitting element to the remote node and back to the receiving element; and
      estimate the location of the remote node using the round trip distance estimates;
   wherein each receiving element is configured to measure the phase of the second wireless signal relative to a common reference phase, and the signal processing unit is configured to estimate the location of the remote node using the phase measurements as well as the round trip distance estimates.

2. An apparatus according to claim 1, wherein the location estimating comprises solving a linear equation relating the location of the remote node to the round trip distance estimates via an array matrix.

3. An apparatus according to claim 2, wherein the solution is a least squares solution.

4. An apparatus according to claim 1, wherein:
each receiving element is configured to measure the time-of-arrival of the second wireless signal relative to a common clock,
the remote node is configured to measure the time-of-arrival of the first wireless signal from the transmitting element, and
the signal processing unit is configured to estimate the round trip distances using the measured times-of-arrival.

5. An apparatus according to claim 1, wherein each receiving element is a transmitting element, and each round trip distance is from an element to the remote node and back to that element.

6. An apparatus according to claim 1, wherein each round trip distance is from a transmitting element to the remote node and back to a receiving element.

7. An apparatus according to claim 1, wherein the location estimating comprises jointly solving a linear equation relating the location of the remote node to the round trip distance estimates via an array matrix, and a linear equation relating the location of the remote node to the phase measurements via a phase array matrix.

8. An apparatus according to claim 7, wherein the solution is a weighted least squares solution, weighted by the variance of the errors in the round trip distance estimates, and the variance of the errors in the phase measurements.

9. An apparatus according to claim 1, wherein the signal processing unit is further configured to resolve the ambiguity in the phase measurements.

10. An apparatus according to claim 9, wherein the ambiguity resolving comprises:
estimating a bearing of the remote node using the round trip distance estimates;
computing, for each receiving element, an integer that embodies the phase ambiguity using the bearing estimate,
wherein the estimating the location of the remote node uses the computed integers to resolve the ambiguity in the respective phase measurements.

11. An apparatus according to claim 9, wherein the ambiguity resolving comprises:
estimating a bearing of the remote node using the round trip distance estimates;
finding a plurality of peaks in the array pattern around the bearing estimate;
computing, for each peak, and for each receiving element, an integer that embodies the phase ambiguity using the bearing estimate;
forming, for each peak, an estimate of the location of the remote node using the computed integers to resolve the ambiguity in the respective phase measurements, and a corresponding error;
choosing the location estimate yielding the smallest error.

12. An apparatus according to claim 1, wherein the location estimating comprises minimising a cost function of the range and bearing of the remote node, the parameters of the cost function being the round trip distance estimates and the location of each receiving element.

13. An apparatus according to claim 1, wherein the location estimating comprises minimising a cost function of the range and bearing of the remote node, the parameters of the cost function being the round trip distance estimates, the phase measurements, and the location of each receiving element.

14. A method of estimating a location of a remote node, the method comprising:
estimating a plurality of round trip distances, each round trip distance being from a transmitting element to the remote node and back to one of a plurality of receiving elements based on a first wireless signal transmitted by the transmitting element to the mobile node and a second wireless signal transmitted by the mobile node to the receiving element, wherein the first wireless signal is used to measure a first time-of-arrival between the apparatus and the remote node and the second wireless signal is used to measure a second time-of-arrival between the remote node and the apparatus;
estimating the location of the remote node using the first time-of-arrival and second time-of-arrival based on the first and second wireless signals to calculate the round trip distance estimates;
measuring the phase of the second wireless signal relative to a common reference phase; and
estimating the location of the remote node using the phase measurements as well as the round trip distance estimates.

* * * * *